March 17, 1953 — D. N. DE HART — 2,631,888
DUMP TRUCK BODY RETURN ATTACHMENT

Filed Nov. 7, 1949 — 2 SHEETS—SHEET 1

Inventor

Daniel N. DeHart

By Clarence A. O'Brien
and Harvey B. Jacobson
Attorneys

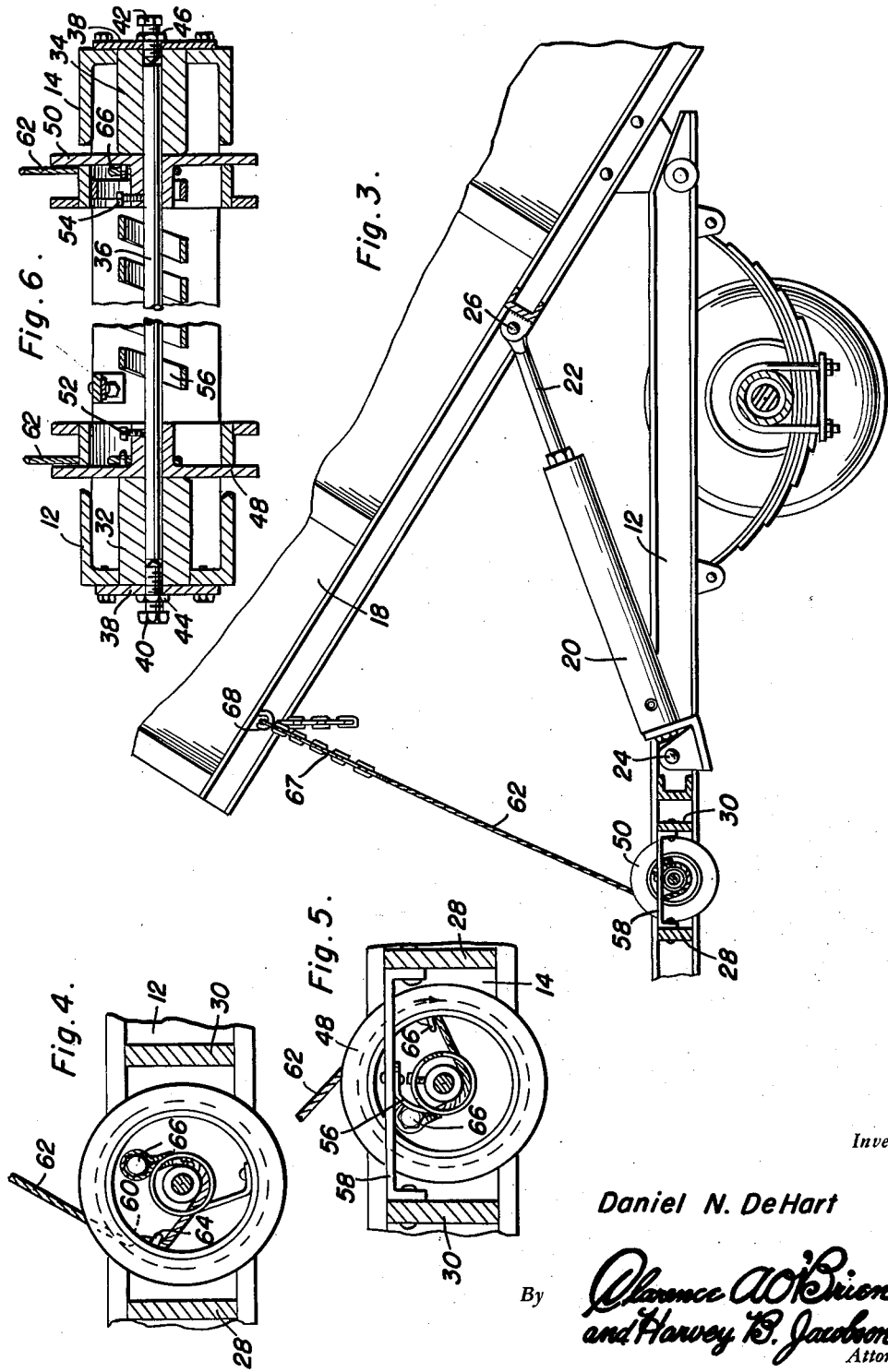

Patented Mar. 17, 1953

2,631,888

UNITED STATES PATENT OFFICE 2,631,888

DUMP TRUCK BODY RETURN ATTACHMENT

Daniel N. De Hart, Kingsford, Mich., assignor of one-half to Russel A. Kesler, Iron Mountain, Mich.

Application November 7, 1949, Serial No. 126,031

6 Claims. (Cl. 298—22)

This invention comprises novel and useful improvements in a dump truck return means and more specifically pertains to a resilient body return means for a dump truck for yieldingly urging the dump body into its lowered position.

The principal object of this invention is to provide an improved mechanism which will prevent the upward tilting movement of a truck dump body beyond its predetermined dumping position as when the center of gravity of the body is changed by a sudden shift of the load thereof during dumping of the body, which means will resiliently urge the dump body to its lowered position.

A further object of the invention is to provide an attachment which may be readily applied to existing power operated raising and lowering means for dump bodies of trucks, for yieldingly urging the truck body to its return or lowered position.

A still further object of the invention is to provide an attachment in conformity with the foregoing objects which shall have an improved yielding and biasing action upon the body for returning the same to its lowered position; and in which the return mechanism is relieved substantially of all tension and strain when the body is in its lowered position; and in which the return tension is increased as the body is progressively raised.

These, together with various ancillary features and objects of the invention, which will later become apparent as the following description proceeds, are attained by the present invention, a preferred embodiment of which has been illustrated by way of example only in the accompanying drawings, wherein:

Figure 3 is a fragmentary vertical longitudinal sectional view taken substantially upon the plane of section line 3—3 of Figure 2 and illustrating certain structural details of the return mechanism;

Figure 4 is a vertical sectional view taken substantially upon the plane of section line 4—4 of Figure 2 and showing the interior of one of the cable drums of the invention;

Figure 1:
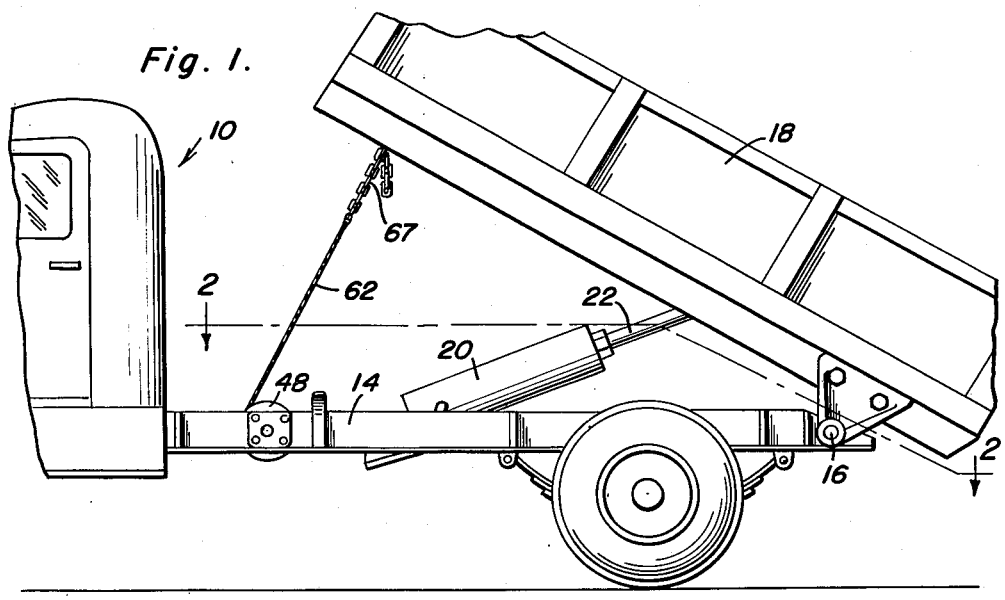
Figure 1 is a side elevational view of a portion of a dump truck showing the dump body in its raised or dumping position and having the novel construction of body return means forming the subject of this invention applied thereto.
Figure 2:
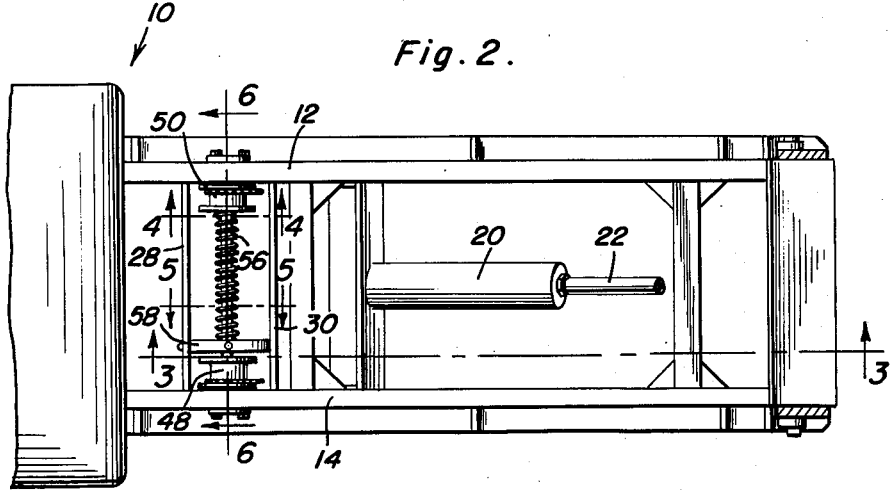
Figure 2 is a horizontal sectional view taken substantially upon the plane of the section line 2—2 of Figure 1 and showing the disposition of the return mechanism upon the frame of the truck.

Figure 5 is a vertical sectional view taken substantially upon the plane of the section line 5—5 of Figure 2 and showing the anchor means of the return spring together with a portion of another of the drums of the mechanism; and Figure 6 is a vertical transverse sectional view taken substantially upon the plane of the section line 6—6, through the return spring and cable drum construction forming a part of the invention.

Referring now more specifically to the accompanying drawings, wherein like numerals designate similar parts throughout the various views, it will be seen that there is indicated generally at 10 a portion of a dump truck, which as shown in Figure 2 includes a pair of side frame members 12 and 14 to which is pivotally secured adjacent the rear end of these members as by transverse pivots 16, a conventional form of dump body indicated at 18.

As shown more clearly in Figure 3, a suitable hydraulic actuating means which may conveniently comprise a conventional and well known form of hydraulic cylinder and piston construction, the cylinder being shown at 20 and the piston not shown being provided with a connecting rod 22, the cylinder and piston rod being pivotally connected as at 24 and 26 respectively, to the truck frame and the truck body, whereby by sutiable control means not shown, the cylinder and piston assembly may be operated in a conventional and well known manner for selectively raising and lowering the truck body from its lowered to its raised position, whereby the contents of the truck body may be dumped or discharged by gravity or other suitable means as desired.

As so far described, the structure indicated is of a conventional and known design and merely represents the environment with which the improvement forming the subject matter of this invention is to be advantageously applied.

In the conventional environment as described, it has been found that when heavily loaded bodies are raised to their dumping positions, the discharge of a part of their contents frequently over balances the body and this change in the center of gravity of the dump body causes the same to tilt beyond the desired dumping inclination, with a resulting damage to the body, the truck, the body raising and lowering mechanism and with other disadvantages. It is therefore the chief purpose of this invention to provide a return mechanism which will effectively prevent this undesired tilting of the truck body beyond the normal dumping position, and which will automatically tend to return the body to its lowered position with a force which varies in proportion to the extent of elevation of the truck body from its rest position.

For the foregoing purpose a pair of transverse frame members 28 and 30 extend between and are rigidly attached to the truck side frame members 12 and 14, and, as shown best in Figure 6, the side frame members 12 and 14 are provided with aligned, inwardly extending journal bearings 32 and 34 of any suitable construction, and an axle 36 is journaled in these bearings by being slid longitudinally therethrough. Cover plates 38 are secured to the frame members 12 and 14 to cover the openings in which the bearings 32 and 34 are received, and adjusting bolts 40 and 42, provided with lock nuts 44 and 46 are screw threadedly engaged through the cover plates 38, the ends of these bolts axially engaging the ends of the axle 36 for adjustably positioning the same in the bearings and for taking up wear or end play in the axle.

A pair of drums or pulleys 48 and 50, are secured to the axle 36 as by set screws 52 and 54, for rotation with the axle. A torsion or coil spring 56 surrounds the axle 36 between the two drums 48 and 50, and this spring has one end fixedly secured to one of the drums such as 50, while its other end is fixedly secured to a frame anchor member 58 which overlies the axle and is rigidly secured to the two transverse frame members 28 and 30 as shown best in Figures 2, 3, 5 and 6. It will thus be apparent that the torsion spring will yieldingly urge the axle containing the two drums in one direction of rotation.

As shown best in Figure 4, it will be apparent that each of the drums is provided with a circumferentially extending peripheral slot 60 through which may extend a body return cable 62, the end of this cable being extended through a guide bushing 64 of any desired character secured on the interior surface of the drum this bushing guiding the cable and preventing chafing of the same against the edge of the slot 60, while the end of the cable is then wound about the axle in the interior of the drum and secured to the side of the drum as by a bolt or the like 66. The cables 62, one for each drum, extending through the slot 60 are wound about the drums and at their other ends are connected by short chains 67 in an adjustable manner to hooks or shackles 68 secured to the truck body.

From the foregoing, the operation of the return mechanism will now be readily apparent. It is intended that the return spring 56 shall have any predetermined pre-loaded torsion applied thereto, so that the cable and chains will at all times yieldingly urge the truck body into its seated position upon the truck frame. When the hydraulic operating means raises the truck body, the cables will be caused to unwind from the drums, thereby rotating the axle and drums against the torsional resistance of the spring 56, further tensioning this spring until the truck body has reached the desired tilting position. Any tendency of the truck body to tilt beyond this position owing to a shift of the center of gravity of the same during the unloading of the body will be resisted by the very great torsion forces applied to the two cables by the spring. When the hydraulic actuating mechanism is released, the cables will yieldingly urge the truck body to its lowered position.

From the foregoing it will be seen that there has been provided an attachment which is of a simple, inexpensive, yet highly dependable and durable construction, and one which will automatically tend to prevent any tendency of the truck body to tilt beyond its desired inclined position during unloading of the same, and which will yieldingly urge the truck body to its lowered position.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction herein described, but all suitable modifications and equivalents may be resorted to, falling within the scope of the appended claims.

Having described the invention, what is claimed as new is:

1. In a dump truck having a frame, a body pivoted thereto, and means comprising a hydraulic cylinder and piston operating member pivoted to said frame for raising said body to tilt the same about its pivot; return means yieldingly urging said body into lowered position on said frame, said return means comprising a transverse axle journaled on said frame, a pair of drums secured to said axle, cables wound upon said drums and connected to said body, a torsion spring surrounding said axle and having one of its ends secured to one of said drums, a pair of transverse frame members on opposite sides of and parallel to said axle, an anchor member connected to said transverse frame members and overlying said axle, said spring having its other end secured to said anchor member, said spring having a predetermined preloaded torsion so that said cables will yieldably urge said body to its seat.

2. The combination of claim 1 including bearings mounted on said frame and journaling the ends of said axle, adjusting bolts adjustable in said bearings and engaging axially the ends of said axle for endwise adjustment of the same, said return means operating to hold said body under tension to prevent tilting of the same beyond the normal dumping position.

3. The combination of claim 1 including a circumferential slot in the periphery of each drum for passage of a cable therethrough, means in the interior of each drum for guiding said cable and means for anchoring the end of a cable in each drum and means located at the opposite sides of said body to which the outer ends of the respective cables are secured.

4. In a dump truck having a frame including a pair of spaced parallel side frame members, a dump body pivotally secured to said frame and means for raising said body; the improvement comprising return means yieldingly urging said body into lowered position on said frame, said return means comprising a transverse axle journaled on and extending between said side frame members, a pair of spaced drums secured to said axle, cables wound upon drums and connected to said dump body, a torsion spring surrounding said axle and extending between said drums, said torsion spring having its ends secured respectively to one of said drums and to said frame, said spring constantly progressively tensioning said cables as said dump body is raised to prevent raising of said body beyond a predetermined angle.

5. The combination of claim 4 including bearings mounted on said side frame members and journaling the ends of said axle, adjusting bolts adjustable in said bearings and engaging axially the ends of said axle for endwise adjustment of the axle and for taking up wear or end play in the same.

6. The combination of claim 4 including a pair of transverse frame members secured to and extending between said side frame members in opposite sides of and parallel to said axle, an anchor member connected to said transverse frame members and overlying said axle, said spring having one end secured to said anchor member.

DANIEL N. DE HART.

REFERENCES CITED

The following references are of record in the file of this patent:

UNITED STATES PATENTS

| Number | Name | Date |
|---|---|---|
| 904,793 | Maxwell | Nov. 24, 1908 |
| 948,092 | Geeseman | Feb. 1, 1910 |
| 1,261,532 | Hoe | Apr. 2, 1918 |
| 1,602,484 | Gorsuch | Oct. 12, 1926 |
| 1,858,797 | Wood et al. | May 17, 1932 |
| 1,986,864 | Tolley | Jan. 8, 1935 |
| 2,391,412 | Gorton | Dec. 25, 1945 |